Jan. 28, 1969  K. F. SMITH ET AL  3,423,979
METHOD AND APPARATUS FOR ELECTROHYDRAULIC FORMING
Filed Aug. 25, 1966

INVENTOR.
KENNETH F. SMITH
RICHARD K. MAY

BY Anderson, Luedeka, Fitch, Even, & Tabin  ATTORNEYS

United States Patent Office 3,423,979
Patented Jan. 28, 1969

3,423,979
METHOD AND APPARATUS FOR ELECTROHYDRAULIC FORMING
Kenneth F. Smith and Richard K. May, Fort Worth, Tex., assignors, by mesne assignments, to Gulf General Atomic Incorporated, San Diego, Calif., a corporation of Delaware
Filed Aug. 25, 1966, Ser. No. 575,009
U.S. Cl. 72—56    8 Claims
Int. Cl. B21d 26/12, 37/16, 31/00

ABSTRACT OF THE DISCLOSURE

A method and apparatus for electro-hydraulic forming is described wherein the workpiece is positioned a given distance from one side of a driver having a hydraulic fluid on the other side. The workpiece is heated, such given distance being sufficient to prevent excessive transfer of heat from the workpiece to the driver.

---

This invention relates to the forming of material and, more particularly, to a method and apparatus for electrohydraulically forming a workpiece.

In recent years, a forming process has been developed known as electrohydraulic forming. In this process electric energy, which is built up at a relatively slow rate in a condenser bank, is suddenly discharged between a pair of electrodes which are immersed in a hydraulic fluid, generally water. This sudden discharge of electrical energy across an electrode gap produces a pressure pulse or shock wave which propagates radially from the line of action of the spark across the gap. The rate of propagation of the shock wave is relatively high, initially exceeding the velocity of sound in the particular medium, and the wave is accordingly of a correspondingly high energy content. The shock wave so produced is utilized to deform a workpiece, usually into a die. By regulating the charge built up on the condenser bank, the deforming force created can be precisely controlled. Thus, the amount of force can be varied such that only the amount of force sufficient to produce a particular desired shape will be applied to the workpiece.

In forming certain types of material, it may be desirable to preheat the workpiece in order that it may be more readily deformed. For example, certain materials are sensitive to high strain rates such as occur during electrohydraulic forming. Such materials, when preheated, may be less susceptible to rupture or excessive thinning than they would be if formed at room temperature. Furthermore, less spark power may be required for forming at higher temperatures and, conversely, thicker workpieces may be formed for a given spark power.

One problem which arises in preheating the workpiece is that substantial amounts of heat may be transferred to the hydraulic fluid and/or other adjacent elements of the apparatus, such as the die. This constitutes a heat loss resulting in a corresponding reduction in efficiency with consequent increased operating costs. Furthermore, when the workpiece is heated by passing an electrical current therethrough, it is desirable that proper insulation be provided to insure that the full heating current passes through the entire workpiece for efficient and uniform heating.

It is an object of this invention to provide an improved method and apparatus for electrohydraulic forming.

Another object of the invention is to provide a method and apparatus for electrohydraulic forming wherein the workpiece is efficiently preheated.

Still another object of the invention is to provide a method and apparatus for electrohydraulic forming wherein the workpiece is preheated and wherein transfer of heat from the workpiece to adjacent elements is minimized.

Figure 1:
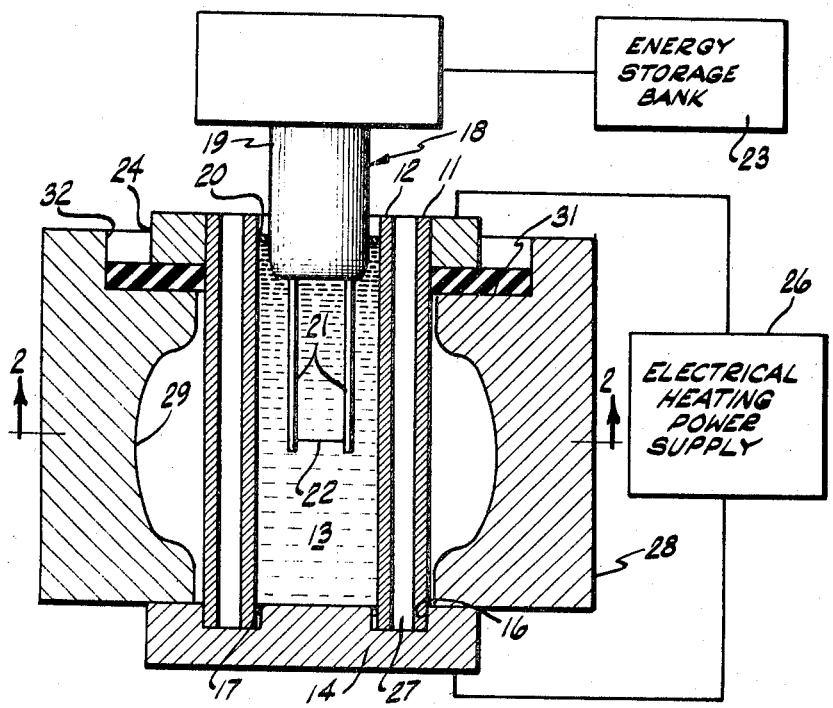
Figure 2:
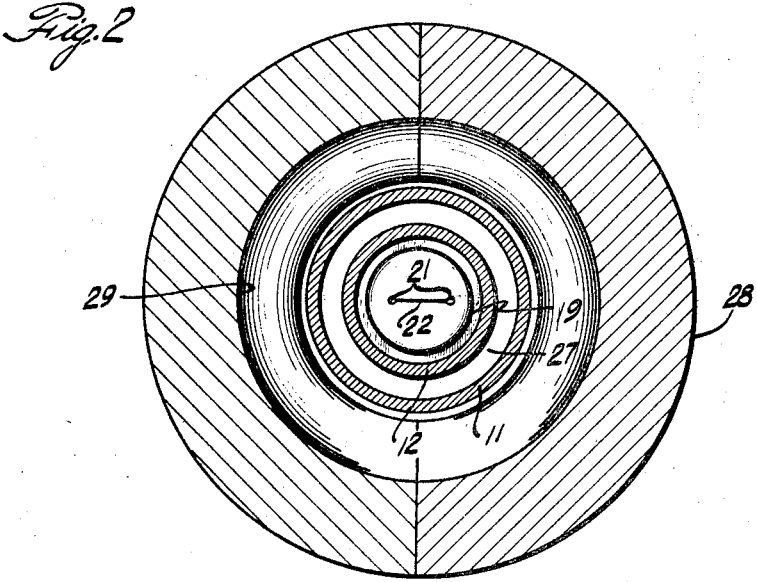

Other objects and the various advantages of the invention will become apparent to those skilled in the art from the following description taken in connection with the accompanying drawing wherein:

FIGURE 1 is an elevational view, partially in full section and partially schematic, of apparatus constructed in accordance with the invention for performing the method of the invention; and FIGURE 2 is a sectional view taken along the line 2—2 of FIGURE 1.

Briefly, as shown in the drawings, a workpiece 11 to be formed is positioned a given distance from one side of a deformable driver 12 having a hydraulic fluid 13 on the other side thereof. The workpiece 11 is then heated to a predetermined temperature without forming the same. The given distance between the driver 12 and the workpiece 11 is sufficient to prevent excessive transfer of heat from the workpiece to the driver. After the workpiece 11 is heated a spark is produced in the hydraulic fluid 13 to cause the driver 12 to engage and form the workpiece in a desired manner. The driver 12 may be etched away from the finished workpiece after forming.

The method of the invention will be more clearly comprehended in connection with the description of the operation of the particular device illustrated in the drawings. It is to be understood, however, that the method of the invention is not limited to practice in connection with the specific apparatus shown. It is to be further understood that the particular apparatus shown is illustrative only of a preferred embodiment of the invention and that other embodiments, not illustrated, may be constructed in accordance with the invention.

Referring now particularly to the drawings, the workpiece 11 is in the form of a tube. The material out of which the workpiece is comprised is deformable and semi-conductive or conductive, such as for example, stainless steel or titanium.

The driver 12 is disposed centrally of the workpiece 11 and is comprised of a material which is easily deformed by the shock wave but has sufficient strength to hold the hydraulic fluid, such as aluminum or high temperature rubber or plastic. The driver 12 is tubular and is closed at one end by a circular conductive clamp plate 14 having an annular recess 16 for receiving and supporting the lower ends of the driver 12 and the workpiece 11. An O-ring seal 17 provides sealing contact between the inner wall of the recess and the cylindrical driver 11.

The driver 11 is filled with the hydraulic fluid 13 which may be water or a nonflammable oil. In the illustrated embodiment, a spark is produced in the hydraulic fluid 13 by an electrohydraulic head unit 18 which includes a snout 19 projecting downwardly through the open end of the driver 12 into the hydraulic fluid 13. A cap seal 20 in the form of an O-ring is provided between the snout 19 and the driver 12. A pair of electrodes 21 project downwardly from the snout 19 and terminate about halfway between the ends of the cylindrical driver 12. A thin wire 22, such as a 30 to 45 mil diameter aluminum wire, is attached across the lower ends of the electrodes 21 to facilitate discharge between the electrodes. This technique is sometimes referred to as the "exploding wire" technique because the wire 22 is destroyed when the high voltage discharge occurs. Thus, a new piece of wire must be positioned between the electrodes 21 for each forming operation when using this technique. If desired, the electrodes 21 may be disposed closer together than shown to obviate the need for a wire. This technique is sometimes referred to as the "spark" technique, wherein the high voltage discharge jumps the gap between the lower ends of the electrodes.

The electrodes 21 are electrically connected to an energy storage means 23. The energy storage means 23 may comprise a plurality of capacitor banks connected in parallel and selectively connected to an external source of direct current power. The energy storage means 23 is controlled to build up a preselected level of electrical charge and to release this charge through the electrodes 21. By way of example, capacitor banks are known in the art which are capable of storing 48 kilojoules of electrical energy and can be fully charged in less than 10 seconds. Some or all of the capacitor banks may be charged at one time to vary the strength of the electrical discharge.

As illustrated, a conductive clamp plate 24, which is annular in configuration, surrounds the outer periphery of the workpiece 11 at the upper end thereof. The clamp plate 24 is in electrical contact with the workpiece, as is the clamp plate 14. An electrical heating power supply 26 is connected to the clamp plates 14 and 24 and provides a source of electrical current which flows through the workpiece. The natural resistance of the workpiece to the flow of electrical current produces heat which raises the temperature of the workpiece to a desired level, according to the voltage placed across the workpiece by the power supply 26.

Although heating of the workpiece may render the material thereof more malleable and consequently make the forming operation easier, heat from the workpiece will be transferred to surrounding elements. Were the driver 12 and/or the hydraulic fluid 13 immediately adjacent the workpiece 11, excessive transfer of heat would result. By excessive transfer of heat, it is meant that rate of heat transfer which results in inefficient operation of the apparatus. What constitutes inefficient operation will, of course, depend upon the cost of electrical power and numerous other manufacturing cost factors. In order to avoid the difficulty of excessive heat transfer, a gap 27 is maintained between the driver 12 and the workpiece 11. The width of the gap 27 is selected such that the heat transferred between the heated workpiece and the driver will be below the maximum allowable level for efficient operation. The transfer of heat may be further reduced by completely or partially filling the gap with thermal insulating material (not shown) which may be in the form of a fragile sheath on the driver 12.

The workpiece 11 is deformed into a die 28. The die 28 may be constructed in separable portions, as is known in the art, and contains an annular surface 29 of curved cross section into which the tubular workpiece 11 is deformed. The curved surface 29 is shown merely by way of example and it will be understood that other die surfaces may be utilized within the scope of this invention.

The upper end of the workpiece 11 is insulated from the die 28 by an insulating annular spacer 31 disposed around the upper end of the workpiece 11 between the upper clamp plate 24 and the die 28. The spacer 31 is received in an annular recess 32 in the upper end of the die 28 to thereby maintain the workpiece 11 in spaced relation to the die. The clamp plates 24 and 14 are urged toward each other and against opposite sides of the die by a suitable mechanical clamping device (not shown) which may be adjustable to a desired holding pressure.

One particular manner of practicing the invention concerns the formation of a titanium tube approximately 3 inches in diameter and approximately 10 inches in length. A driver of aluminum approximately 2.5 inches in diameter is mounted on the lower copper clamp plate 14 and sealed. The workpiece is then mounted on the lower copper clamp plate and the split die 28 is closed about the workpiece. The driver 12 is filled with water and the electrodes 21 are inserted into the water-filled driver through the upper seal 20. Current is passed from the lower clamp plate 14 through the workpiece 11 and into the upper clamp plate 24 to heat the workpiece. When the workpiece reaches the desired temperature, a selected electrical energy charge is released to expand the driver into the workpiece, which in turn is formed into the die 28. After forming, the driver is removed from the workpiece. A current of 1500 amperes for a period of time of 30 seconds is used to raise the temperature of the titanium workpiece to 1150 degrees Fahrenheit. In order to provide sufficient electrical insulation and prevent excessive heat transfer between the workpiece and the drive 11 and the die 28, the driver and die are spaced, respectively, .250 inch and .125 inch from the workpiece.

In forming a workpiece comprising a 3-inch diameter aluminum tube, and utilizing a driver comprised of 2.5 inches, the workpiece is heated to 1150 degrees Fahrenheit. At this temperature, a gap between the workpiece and the driver of .250 inch is satisfactory and a gap between the workpiece and the die of .125 inch is satisfactory.

It may therefore be seen that the invention provides an improved method and apparatus for electrohydraulic forming. The invention enables the workpiece to be preheated to a temperature wherein it is readily deformed without the danger of excessive heat transfer to the other elements of the apparatus. Various embodiments of the invention other than those shown herein will be apparent to those skilled in the art from the foregoing discussion. Such other embodiments are intended to fall within the scope of the appended claims.

What is claimed is:

1. A method of forming a workpiece comprising positioning the workpiece a given distance from one side of a driver having a hydraulic fluid on the other side thereof, heating the workpiece to a predetermined temperature without forming the same, said given distance being sufficient to prevent excessive transfer of heat from the workpiece to the driver, and producing a spark in the hydraulic fluid to deform the driver and cause it to engage and deform the workpiece in a desired manner.

2. A method in accordance with claim 1 wherein the workpiece is positioned between the driver and a die and is maintained at a distance from the die during heating of the workpiece, which distance is sufficient to prevent excessive transfer of heat from the workpiece to the die.

3. A method in accordance with claim 1 wherein the workpiece is heated by passing an electric current therethrough.

4. Apparatus for forming a workpiece, including in combination, a driver, a hydraulic fluid on one side of said driver, means for positioning the workpiece a given distance from the other side of said driver, means for heating the workpiece to a predetermined temperature without forming the same, said given distance being sufficient to prevent excessive transfer of heat from the workpiece to the driver, and means for producing a spark in the hydraulic fluid to deform the driver and cause it to engage and deform the workpiece in a desired manner.

5. Apparatus in accordance with claim 4 including a die positioned to be on the opposite side of the workpiece from said driver, said workpiece positioning means being adapted to maintain the workpiece at a distance from said die during heating of the workpiece, which distance is sufficient to prevent excessive transfer of heat from the workpiece to said die.

6. Apparatus in accordance with claim 4 wherein said workpiece heating means comprise means for passing an electric current through the workpiece.

7. Apparatus in accordance with claim 5 for shaping a workpiece which is tubular, wherein said die is of substantially annular configuration, and wherein said driver comprises a generally cylindrical deformable wall and further comprises means at each end of said wall cooperating therewith to define a chamber enclosing the hydraulic fluid.

8. Apparatus in accordance with claim 7 wherein said workpiece heating means comprise means for passing an electric current through the workpiece, and wherein an annular insulating member is provided for spacing the workpiece from said annular die.

References Cited

UNITED STATES PATENTS

| | | | |
|---|---|---|---|
| 2,443,336 | 6/1948 | Waldie | 72—342 |
| 2,935,038 | 5/1960 | Chatten | 29—421 |
| 3,068,882 | 12/1962 | Orr et al. | 72—56 |
| 3,222,902 | 12/1965 | Brejcha et al. | 72—56 |
| 3,222,902 | 12/1965 | Brejcha et al. | 72—56 |

RICHARD J. HERBST, *Primary Examiner.*